(12) United States Patent
Shimoyama

(10) Patent No.: US 9,157,819 B2
(45) Date of Patent: Oct. 13, 2015

(54) WHEEL COMPONENT FORCE DETECTING APPARATUS

(71) Applicant: Fuji Jukogyo Kabushiki Kaisha, Tokyo (JP)

(72) Inventor: Hiroshi Shimoyama, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/265,197

(22) Filed: Apr. 29, 2014

(65) Prior Publication Data

US 2014/0331789 A1    Nov. 13, 2014

(30) Foreign Application Priority Data

May 8, 2013    (JP) ................... 2013-098599

(51) Int. Cl.
*G01L 3/10* (2006.01)
*B60B 27/00* (2006.01)
*G01L 1/00* (2006.01)

(52) U.S. Cl.
CPC ............. *G01L 3/108* (2013.01); *B60B 27/0068* (2013.01); *G01L 1/005* (2013.01)

(58) Field of Classification Search
CPC ...... G01L 1/005; G01L 3/108; B60B 27/0068
USPC ................... 73/862.08, 862.322, 862.338
See application file for complete search history.

(56) References Cited

U.S. PATENT DOCUMENTS

| | | | |
|---|---|---|---|
| 2011/0125421 A1* | 5/2011 | Takahashi et al. | 702/42 |
| 2011/0278909 A1* | 11/2011 | Chen et al. | 301/6.5 |
| 2014/0245838 A1* | 9/2014 | Nagano et al. | 73/767 |
| 2014/0285128 A1* | 9/2014 | Ozaki | 318/400.13 |
| 2014/0330470 A1* | 11/2014 | Ozaki et al. | 701/22 |

FOREIGN PATENT DOCUMENTS

JP    2008-074136 A    4/2008

* cited by examiner

*Primary Examiner* — Max Noori
(74) *Attorney, Agent, or Firm* — McGinn IP Law Group, PLLC

(57) ABSTRACT

A wheel component force detecting apparatus for detecting a component force on a wheel includes a cylindrical axle flange, an electric motor, and a wheel unit. The electric motor includes a stator and an armature. The wheel component force detecting apparatus includes a pair of sensing units each including a cylinder and a bridge circuit. The cylinder is mounted outside the circumferential surface of the axle flange and has a first end fixed to the axle flange and a second end fixed to the stator. The bridge circuit includes a plurality of strain gages disposed on the cylinder. The pair of sensing units is symmetrical in the axial direction of the axle flange with respect to the stator.

2 Claims, 6 Drawing Sheets

WHEEL COMPONENT FORCE DETECTING APPARATUS

CROSS-REFERENCE TO RELATED APPLICATIONS

The present application claims priority from Japanese Patent Application No. 2013-098599 filed on May 8, 2013, the entire contents of which are hereby incorporated by reference.

BACKGROUND

1. Technical Field

The present invention relates to a wheel component force detecting apparatus for detecting a component force of a load on a wheel rotated by an electric motor and, in particular, to a wheel component force detecting apparatus for use in a wheel including an electric motor incorporated into a wheel unit.

2. Related Art

An in-wheel motor, in which an electric motor is incorporated into the housing of a wheel, is a focus of attention as a source of driving a vehicle, such as an electric car. When the in-wheel motor is used in each of driving wheels of an electric car, because each driving wheel is individually rotatable, it is not necessary to have a large-scale power transmitting mechanism, such as a propeller shaft or a differential, and this can contribute to weight reduction and miniaturization of the vehicle.

To achieve practical utilization of the in-wheel motor, it is of course required to measure a rotation speed of each wheel to control a running speed or other element, and it may be necessary to measure a load on each wheel while the vehicle is running and to control an attitude of the vehicle using that measurement in order to ensure vehicle driving safety. Typically, the wheels take unequal loads. For example, a heavy load is placed on the wheels on the outer side in cornering, placed on the wheels on one side in running on a leftward or rightward inclined surface, and placed on the front wheels in braking. In addition, for example, when a load placed on the vehicle is uneven, the wheels also take unequal loads. If the loads on the wheels can be detected at any time, controlling a suspension or other element while the vehicle is running on the basis of that detection enables attitude control (e.g., prevention of rolling in cornering, prevention of sinking of the front wheels in braking, prevention of sinking caused by unevenness of loads placed). Similarly, measurement of component forces around wheel sensors with high precision enables calculation of contact forces of tires, appropriate driving torque distribution and braking torque distribution.

As illustrated in Japanese Unexamined Patent Application Publication (JP-A) No. 2008-74136, a wheel component force detecting apparatus is proposed that includes a strain sensor disposed on an outer ring (race in JP-A No. 2008-74136) on a static side of a bearing that supports a hub of a wheel of a vehicle, the hub being connected to an output shaft of an in-wheel motor (electric motor in JP-A No. 2008-74136) with a speed reducer disposed therebetween.

That known wheel component force detecting apparatus is disposed on the hub, and the in-wheel motor is disposed outside the hub. The in-wheel motor protrudes from the wheel, and miniaturization of the vehicle is difficult.

Disposing the in-wheel motor inside the wheel can contribute to miniaturization of the vehicle. However, if the in-wheel motor is disposed inside the wheel, the hub would be disposed inside the wheel, the strain sensor on the hub would be affected by a magnetic field of the in-wheel motor, and it may be difficult to accurately detect a load on the wheel.

SUMMARY OF THE INVENTION

Accordingly, it is an object of the present invention to provide a wheel component force detecting apparatus capable of contributing to miniaturization of a vehicle and of accurately detecting a load on a wheel.

An aspect of present invention provides a wheel component force detecting apparatus for detecting a component force on a wheel. The wheel component force detecting apparatus includes a pair of sensing units each including a cylinder and a component force detector. The wheel includes an axle connector, an electric motor, and a wheel unit. The axle connector is cylindrical and connected with an axle. The electric motor includes a stator and an armature. The stator is fixed on the axle connector and disposed around an outer periphery in a radial direction of the axle connector. The armature is rotatably supported by the axle connector and rotatable outside the stator. The wheel unit holds the armature, is rotatably supported by the axle connector, and is rotatable by power from the electric motor. The cylinder is mounted outside a circumferential surface of the axle connector and has a first end fixed to the axle connector and a second end fixed to the stator. The component force detector includes a plurality of strain sensors disposed on the cylinder. The pair of sensing units are symmetrical in an axial direction of the axle connector with respect to the stator.

The component force detector may form a bridge circuit including at least four strain sensors provided per component force on the wheel.

DETAILED DESCRIPTION

A wheel component force detecting apparatus according to a preferred implementation of the present invention is described below with reference to FIGS. 1 to 6. Before the wheel component force detecting apparatus is described, a wheel equipped with the wheel component force detecting apparatus is first described. In the present implementation, the wheel of a vehicle, such as a car, is described as an example. The wheel is not limited to one used in the car and may also be one used in a two-wheel vehicle.

Figure 1:
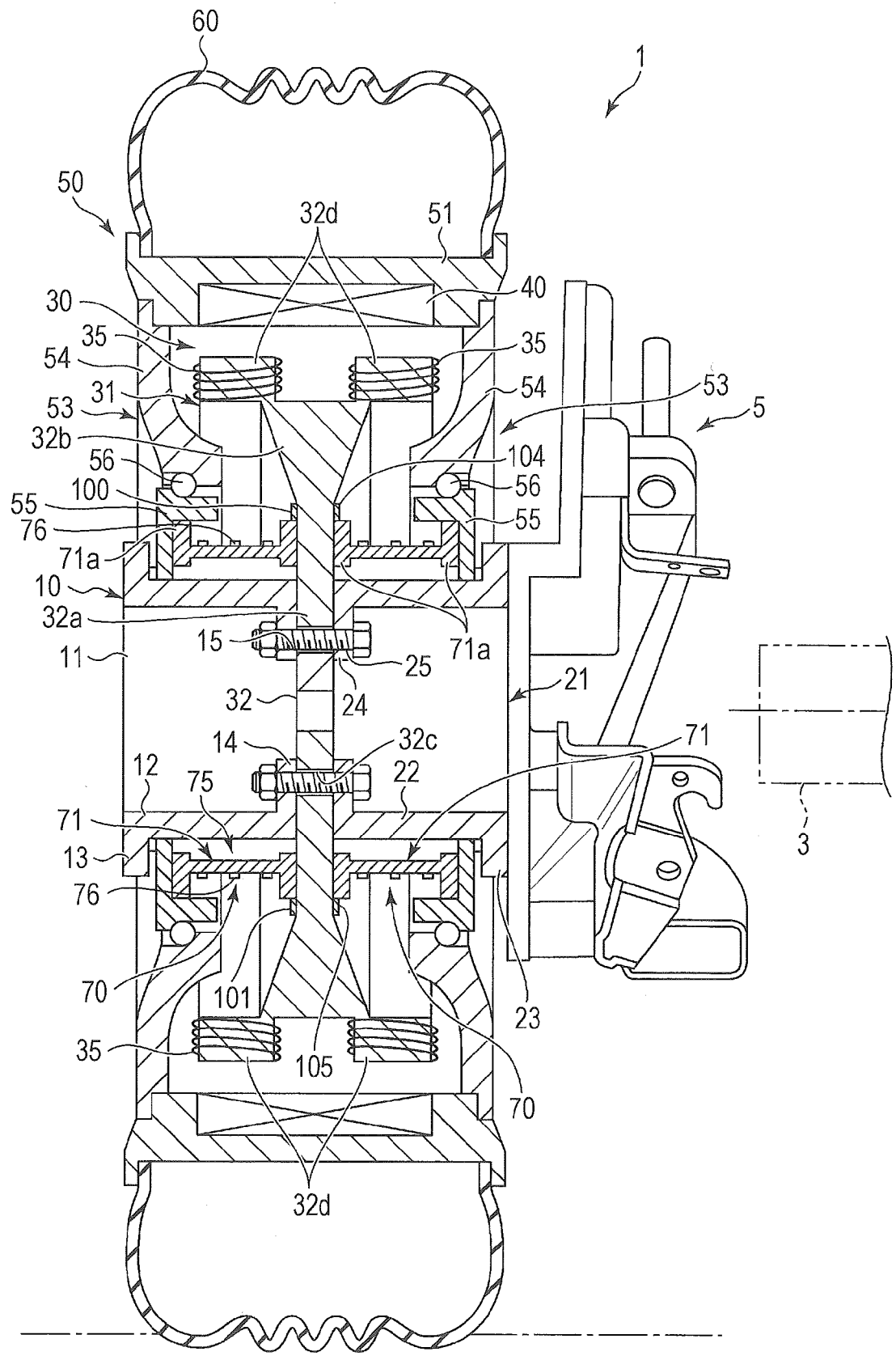
FIG. 1 is a cross-sectional view that illustrates a wheel equipped with a wheel component force detecting apparatus according to an implementation of the present invention.

As illustrated in FIG. 1 (cross-sectional view), a wheel 1 includes an axle flange 10, an electric motor 30, a wheel unit 50, and a tire 60. The axle flange 10 is cylindrical and connected with an axle 3 of a car. The electric motor 30 is mounted on the axle flange 10. The wheel unit 50 is rotatably supported by the axle flange 10 and rotatable by power from the electric motor 30. The tire 60 is mounted on the wheel unit 50. The axle flange 10 may have shapes other than cylindrical.

The axle flange 10 includes an axle flange external portion 11 disposed in an outer region in the axial direction of the wheel 1 and an axle flange internal portion 21 disposed in an inner region in the axial direction of the wheel 1. The axle flange external portion 11 and the axle flange internal portion 21 are bilaterally symmetrical with respect to the wheel axial direction. The axle flange external portion 11 is described below as a representative. The reference numerals corresponding to similar parts in the axle flange external portion 11 are used in the axle flange internal portion 21, and the description thereof is omitted.

The axle flange external portion 11 includes a flange main body 12, an outer flange section 13, and an inner flange section 14. The flange main body 12 has a hollow cylindrical shape. The outer flange section 13 is disposed on an external end in the axial direction of the flange main body 12, extends outward in the radial direction, and is annular. The inner flange section 14 is disposed on an internal end in the axial direction of the flange main body 12, extends inward in the radial direction, and is annular. The inner flange section 14 has a plurality of holes 15 each allowing a shaft of a bolt to pass therethrough. The axle flange external portion 11 and the axle flange internal portion 21 are disposed such that the inner flange section 14 and an internal flange section 24 are opposite each other and are coupled to each other with a stator 31 disposed therebetween. The stator 31 is included in the electric motor 30. The axle flange internal portion 21 includes an external flange section 23, and the external flange section 23 is attached to a suspension device 5.

The electric motor 30 includes the stator 31 and an armature 40. The stator 31 is fixed to the axle flange external portion 11 and the axle flange internal portion 21 and surrounds the outer periphery in the radial direction of the axle flange 10. The armature 40 is rotatably supported by the axle flange 10 and is rotatable outside the stator 31. The stator 31 is made of a magnetic material and includes a disk-shaped stator core 32 and a stator coil 35 wound around the outer end in the radial direction of the stator core 32. The stator core 32 includes a disk-shaped core main body 32a inside and an annular core outer edge 32b on the outer edge of the core main body 32a.

The core main body 32a has a plurality of holes 32c in an inner area in the radial direction. The holes 32c are used for fixing the axle flange external portion 11 and the axle flange internal portion 21 to the core main body 32a. The core main body 32a has an outside diameter larger than that of each of the axle flange external portion 11 and the axle flange internal portion 21.

A pair of protrusions 32d symmetrical in the width direction with respect to the core main body 32a is disposed on the core outer edge 32b. The protrusions 32d are spaced at a predetermined interval in the circumferential direction of the core main body 32a. The stator coil 35 is wound around each of the protrusions 32d, and they form an electromagnet.

The armature 40 is a permanent magnet disposed inside the wheel unit 50. The armature 40 is opposite the tips of the protrusions 32d such that a predetermined gap is present therebetween. An electric current passes through the stator coil 35. By controlling the electric current passing through the stator coil 35, the wheel unit 50 is rotated in a predetermined direction with respect to the stator 31.

The wheel unit 50 includes a cylindrical rim 51 and a disk 53 mounted on the rim 51. The tire 60 is mounted on the rim 51. The disk 53 covers the openings on both sides in the width direction of the rim 51. The above-described armature 40 in the electric motor 30 is mounted inside the rim 51. The disk 53 includes an outer ring 54, an inner ring 55, and a plurality of rollers 56 disposed between the outer ring 54 and the inner ring 55. The outer ring 54 has an outer end in the radial direction connected with the rim 51 and extends inward in the radial direction. The inner ring 55 is opposite the inner end of the outer ring 54. The disk 53 forms a bearing that enables the outer ring 54 to rotate with respect to the inner ring 55.

The inner end of the inner ring 55 is fixed to the outer circumferential surface of each of the axle flange external portion 11 and the axle flange internal portion 21. A pair of wheel component force detecting apparatuses 70 for detecting a component force on the wheel 1 is disposed inside the inner ring 55. Each of the wheel component force detecting apparatuses 70 includes a sensing unit 75 including a cylinder 71 and a plurality of strain gages 76 to 99 (see also FIG. 3) disposed on the cylinder 71. The cylinder 71 is mounted outside the circumferential region of each of the axle flange external portion 11 and the axle flange internal portion 21. The pair of wheel component force detecting apparatuses 70 is symmetrical in the wheel width direction with respect to the stator 31.

Figure 2:
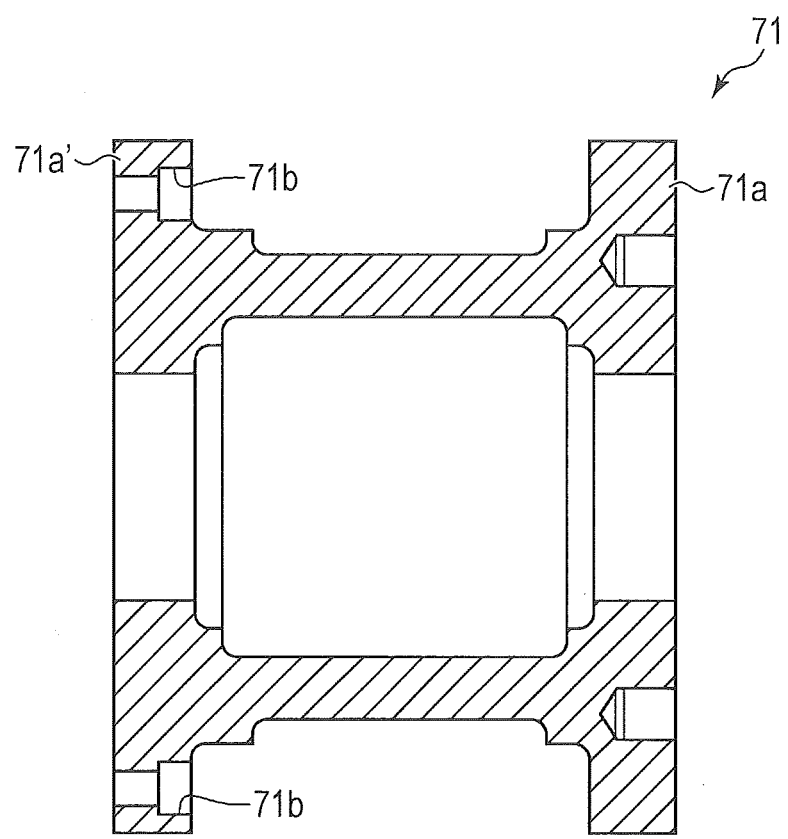
FIG. 2 is a cross-sectional view that illustrates a cylinder in the wheel component force detecting apparatus.

The cylinder 71 in the sensing unit 75 includes annular flanges 71a disposed on both ends in the axial direction, and the flanges 71a extend outward in the radial direction, as illustrated in FIGS. 1 and 2 (cross-sectional views). The flanges 71a have a plurality of holes 71b spaced at predetermined intervals in the circumferential direction. The holes 71b allow bolts to pass therethrough. The outside flange 71a in the cylinder 71 is fixed to the inner ring 55 with bolts disposed therebetween such that it is in contact with the inner side of the inner ring 55. The inside flange 71a' in the cylinder 71 is fixed to the stator core 32 in the stator 31 with bolts disposed therebetween. That is, the cylinder 71 is fixed to the axle flange external portion 11 and the axle flange internal portion 21 with the inner ring 55 and the stator core 32 disposed therebetween.

Figure 3:
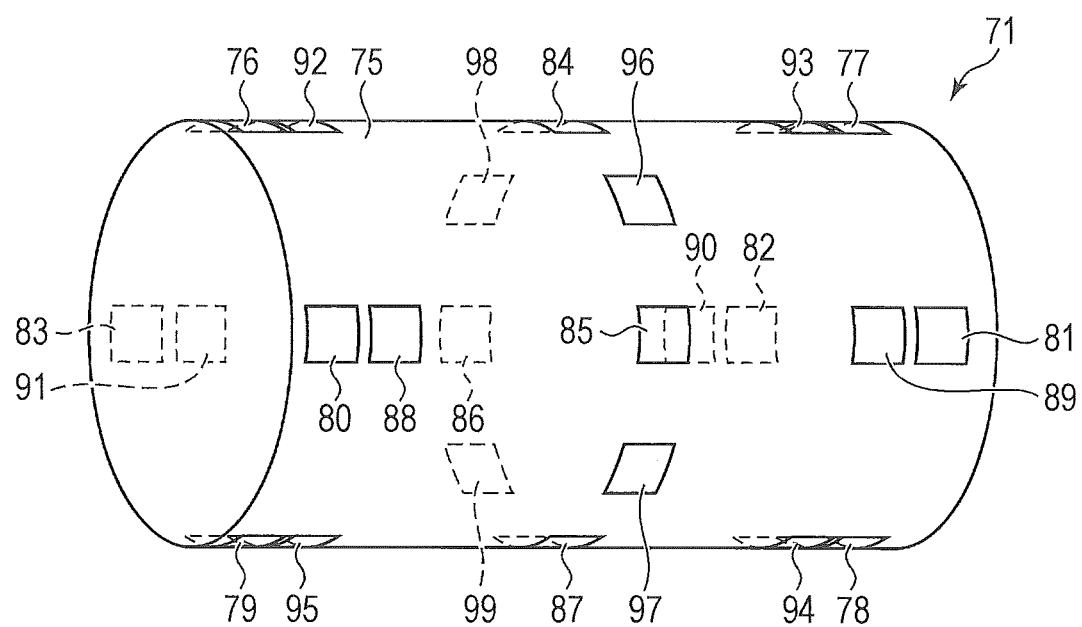
FIG. 3 is a schematic diagram for describing arrangement of a plurality of strain gages on the cylinder.

The plurality of strain gages 76 to 99 are mounted on the outer circumferential surface of the cylinder 71, as illustrated in FIG. 3 (schematic diagram). The strain gages 76 to 99 are classified into an Fx detection system for detecting a force in a radial direction (hereinafter referred to as "x-axis direction") with respect to the cylinder 71, an Fy detection system for detecting a force in a vertical radial direction perpendicular to the x-axis direction (hereinafter referred to as "y-axis direction") with respect to the cylinder 71, an Fz detection system for detecting a force in an axial direction (hereinafter referred to as "z-axis direction") with respect to the cylinder 71, an Mx detection system for detecting a moment Mx about the x-axis with respect to the cylinder 71, an My detection system for detecting a moment My about the y-axis with respect to the cylinder 71, and an Mz detection system for detecting a moment Mz about the z-axis with respect to the cylinder 71.

The Fx detection system is configured to include the four strain gages 76 to 79. The strain gages 76 to 79 are uni-axial strain gages and are affixed to the outer circumferential surface of the cylinder 71 in upper and lower portions in both ends of such that their detection directions are substantially parallel to the axial direction of the cylinder 71.

The Fy detection system is configured to include the four strain gages 80 to 83. The strain gages 80 to 83 are uni-axial strain gages and are affixed to the outer circumferential surface of the cylinder 71 in immediate portions in the vertical direction in both ends such that their detection directions are substantially parallel to the axial direction of the cylinder 71.

The Fz detection system is configured to include the four strain gages 84 to 87. The strain gages 84 to 87 are uni-axial strain gages and are affixed to the outer circumferential surface of the cylinder 71 in the upper and lower portions at an intermediate site in the axial direction and in the intermediate portions in the vertical direction such that their detection directions are substantially parallel to the axial direction of the cylinder 71.

The Mx detection system is configured to include the four strain gages 88 to 91. The strain gages 88 to 91 are uni-axial strain gages and are affixed to the outer circumferential surface of the cylinder 71 such that their detection directions are substantially parallel to the axial direction of the cylinder 71. The strain gages 88 to 91 are positioned inside and adjacent to the four strain gages 80 to 83 in the above-described Fy detection system, respectively.

The My detection system is configured to include the four strain gages 92 to 95. The strain gages 92 to 95 are uni-axial strain gages and are affixed to the outer circumferential surface of the cylinder 71 such that their detection directions are substantially parallel to the axial direction of the cylinder 71. The strain gages 92 to 95 are positioned inside and adjacent to the four strain gages 76 to 79 in the above-described Fx detection system, respectively.

The Mz detection system is configured to include the four strain gages 96 to 99. The strain gages 96 to 99 are uni-axial strain gages and are affixed to the outer circumferential surface of the cylinder 71 in intermediate locations in the circumferential direction of the cylinder 71 between two neighboring strain gages of the four strain gages 84 to 87 in the above-described Fz detection system such that their detection directions are substantially parallel to the axial direction of the cylinder 71.

The Fx detection system, Fy detection system, Fz detection system, Mx detection system, My detection system, and Mz detection system form a bridge circuit including the four strain gages 76 to 79, that including the four strain gages 80 to 83, that including the four strain gages 84 to 87, that including the four strain gages 88 to 91, that including the four strain gages 92 to 95, and that including the four strain gages 96 to 99, respectively.

Figure 4:
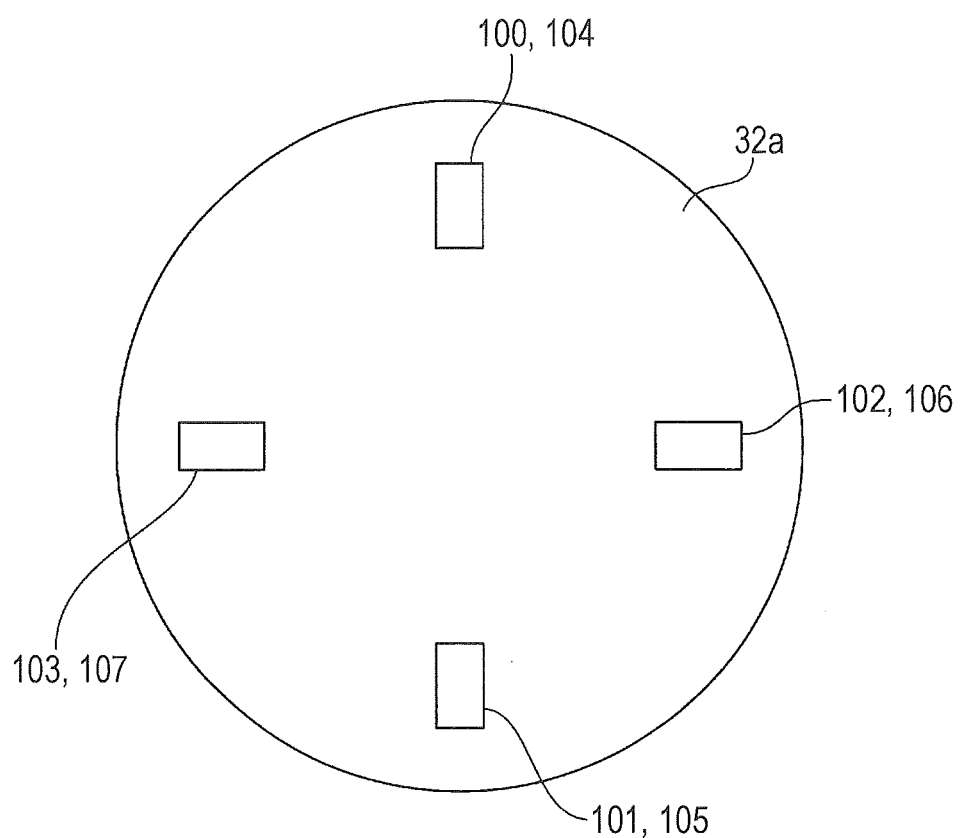
FIG. 4 is an illustration for describing arrangement of a plurality of strain gages disposed on a stator coil.

A plurality of strain gages 100 to 107 are disposed on both sides in the width direction of the stator core 32 outside the cylinder 71 in the radial direction, as illustrated in FIGS. 1 and 4. The four strain gages 100 to 103 are disposed on one of both sides of the stator core 32 in the width direction, and the other four strain gages 104 to 107 are disposed on the other side thereof. The strain gages 100 to 103 and 104 to 107 are spaced at predetermined intervals in the circumferential direction of the stator core 32. The two strain gages 100 and 101 of the four strain gages 100 to 103 and the two strain gages 104 and 105 of the four strain gages 104 to 107 are disposed on the upper and lower portions in both ends of the stator core 32 and are affixed to the side surfaces of the stator core 32 so as to be substantially parallel to the y-axis direction. The remaining two strain gages 102 and 103 and the remaining two strain gages 106 and 107 are disposed on the ends in the x-axis direction of the stator core 32 and are affixed to the side surfaces of the stator core 32 so as to be substantially parallel to the x-axis direction. The four strain gages 100 to 103 form a bridge circuit, and the four strain gages 104 to 107 form a bridge circuit.

Figure 5:
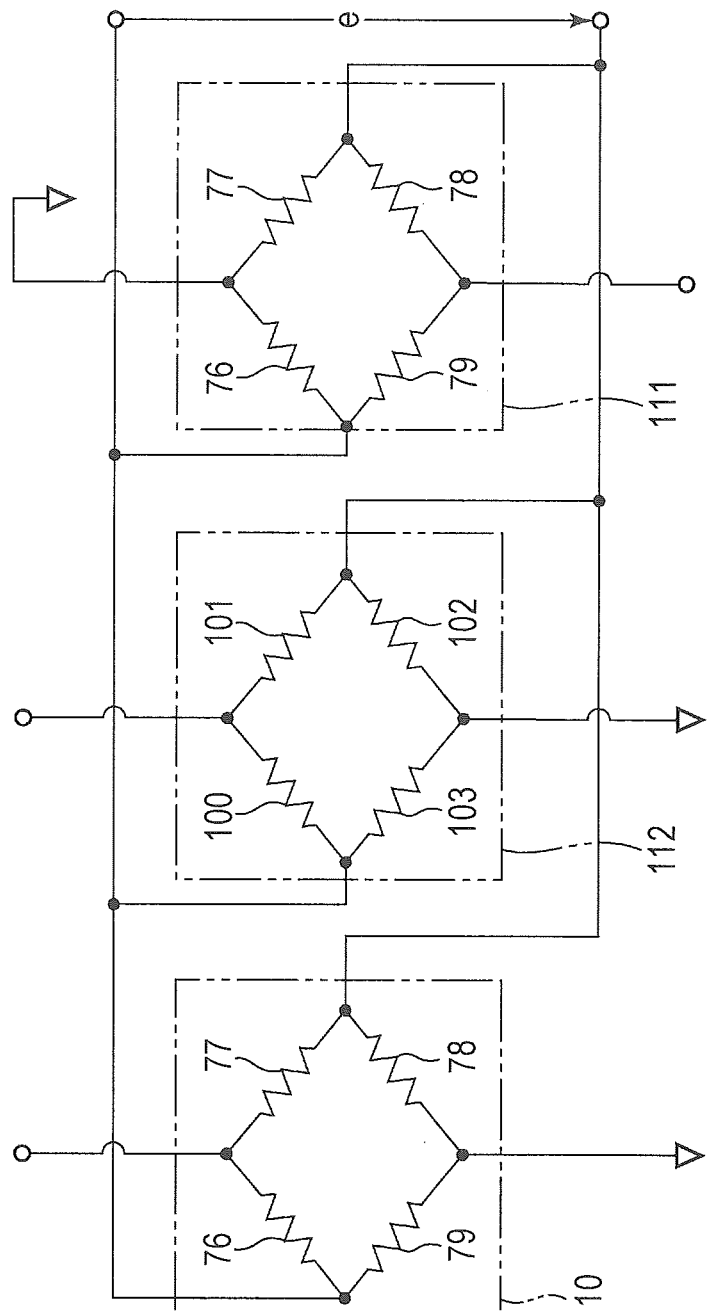
FIG. 5 is a circuit diagram of the wheel component force detecting apparatus including bridge circuits each including four strain gages.

A bridge circuit 110 including the strain gages 76 to 99 in the sensing unit 75 disposed outside the stator 31, a bridge circuit 111 including the strain gages 76 to 99 in the sensing unit 75 disposed inside the stator 31, and a bridge circuit 112 including the strain gages 100 to 107 disposed on the stator core 32 are electrically connected in parallel with respect to an input voltage e, as illustrated in FIG. 5, and an output voltage from each of the bridge circuits 110, 111, and 112 is detected.

The output voltage of the bridge circuit 111 including the strain gages 76 to 99 disposed inside the stator 31 is extracted such that the direction of increase and decrease in the output voltage occurring when a magnetic field arising from the stator core 32 is reversed with respect to the output voltage of the bridge circuit 110 including the strain gages 76 to 99 disposed outside the stator 31.

Figure 6:
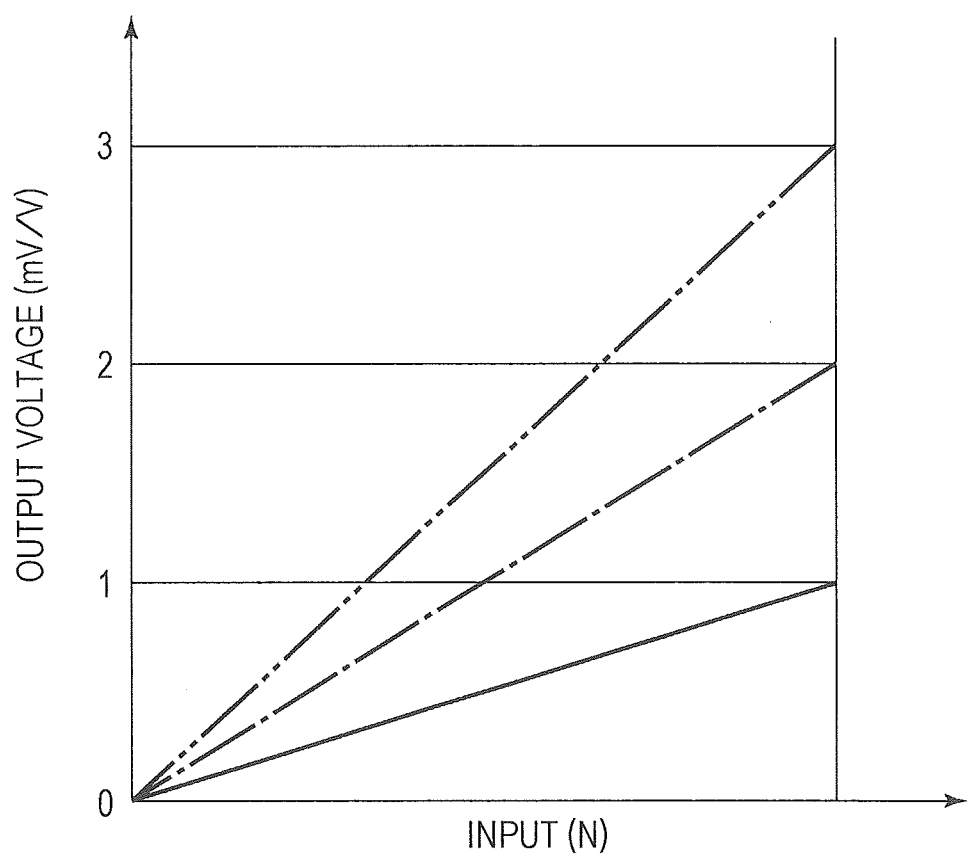
FIG. 6 is a graph that illustrates ratios of output voltages to inputs for different numbers of sensing units.

Next, actions of the wheel component force detecting apparatus 70 are described below with reference to FIGS. 1, 5, and 6. As illustrated in FIG. 1, when an electric current is supplied to the electric motor 30, the wheel 1 rotates, and a vehicle runs, the wheel 1 receives a force from the road surface. That force is transmitted to the axle flange external portion 11, the axle flange internal portion 21, and the stator 31 through the tire 60 and the wheel unit 50. When the axle flange external portion 11, the axle flange internal portion 21, and the stator 31 are deformed by that force, the sensing unit 75 is also deformed. The amount of the deformation of the sensing unit 75 is converted into a voltage value and detected by the plurality of strain gages 76 to 99 in the sensing unit 75.

For example, when the force on the wheel 1 contains an element in the radial direction (x-axis direction) with respect to the cylinder 71 in the sensing unit 75, the magnitude of the component force in the element in the x-axis direction is converted into a voltage value and detected by the strain gages 76 to 79 in the Fx detection system. When the force on the wheel 1 produces a moment about the x-axis with respect to the cylinder 71, the magnitude of the moment about the x-axis is converted into a voltage value and detected by the strain gages 88 to 91 in the Mx detection system.

To change the number of revolutions of the wheel 1, the magnitude of the electric current passing through the stator coil 35 is changed. At that time, the magnetic field arising from the stator coil 35 changes, and the output voltage of the strain gages 76 to 99 is thus changed. That makes it difficult to accurately detect the magnitude of the component force on the wheel 1.

The wheel 1 is equipped with the pair of the wheel component force detecting apparatuses 70 with respect to the width direction of the stator. When the magnetic field arising from the stator coil 35 changes, the output voltage of one of the wheel component force detecting apparatuses 70 increases, whereas the output voltage of the other one of the wheel component force detecting apparatuses 70 reduces. When those output voltages are added together, the increase and reduction caused by the change in the magnetic field can be cancelled. The value of the addition of the output voltages from the pair of wheel component force detecting apparatuses 70 is an accurate output voltage value, regardless of whether the magnetic field changes, and the force on the wheel 1 can be accurately detected.

The wheel 1 is equipped with the two wheel component force detecting apparatuses 70. FIG. 6 illustrates that the magnitude of the output voltage in the case where the wheel 1 is equipped with the two wheel component force detecting apparatuses 70, indicated by a dash-dot line, can be approximately twice that in the case where the wheel 1 is equipped with the single wheel component force detecting apparatus 70, indicated by a solid line. Thus the ratio of the output voltage value to the component force (input) on the wheel 1 can be increased, and the component force (input) on the wheel 1 can be more accurately detected.

The wheel 1 is equipped with the bridge circuit 112 (see FIG. 5) including the strain gages 100 to 107 on the stator core 32, in addition to the two wheel component force detecting apparatuses 70. When a value obtained by the addition of the value of an output voltage from the bridge circuit 112 to the value of output voltages from the two wheel component force detecting apparatuses 70 is an output voltage value corresponding to a force on the wheel 1, the magnitude of the output voltage in that case, indicated by a dot-dot-dash line in FIG. 6, can be approximately three times that in the case where the wheel 1 is equipped with the single wheel component force detecting apparatus 70, indicated by the solid line. Accordingly, the component force on the wheel 1 can be further more accurately detected.

The two wheel component force detecting apparatuses 70 are disposed inside the wheel 1. That facilitates miniaturization of a vehicle. In the above-described implementation, the strain gages 76 to 99 are illustrated as a unit to detect a component force. The unit to detect the component force may be semiconductor strain sensors.

The invention claimed is:

1. A wheel component force detecting apparatus for detecting a component force on a wheel, the wheel component force detecting apparatus comprising:

a pair of sensing units each including a cylinder and a component force detector, wherein the wheel includes an axle connector, an electric motor, and a wheel unit;

the axle connector is cylindrical and connected with an axle;

the electric motor includes a stator and an armature, the stator is fixed to the axle connector and disposed around an outer periphery in a radial direction of the axle connector, and the armature is rotatably supported by the axle connector and rotatable outside the stator;

the wheel unit holds the armature, is rotatably supported by the axle connector, and is rotatable by power from the electric motor;

the cylinder is mounted outside a circumferential surface of the axle connector and has a first end fixed to the axle connector and a second end fixed to the stator;

the component force detector includes a plurality of strain sensors disposed on the cylinder; and the pair of sensing units is symmetrical in an axial direction of the axle connector with respect to the stator.

2. The wheel component force detecting apparatus according to claim 1, wherein the component force detector forms a bridge circuit including at least four strain sensors provided per component force on the wheel.

* * * * *